US007440920B2

(12) United States Patent  (10) Patent No.: US 7,440,920 B2
Rust  (45) Date of Patent: *Oct. 21, 2008

(54) TOOL FOR ESTIMATING A COST OF A TRADE

(75) Inventor: Colin James Rust, New York, NY (US)

(73) Assignee: Lehman Brothers Inc., New York, NY (US)

( * ) Notice: Subject to any disclaimer, the term of this patent is extended or adjusted under 35 U.S.C. 154(b) by 162 days.

This patent is subject to a terminal disclaimer.

(21) Appl. No.: 11/497,960

(22) Filed: Aug. 1, 2006

(65) Prior Publication Data

US 2006/0271469 A1      Nov. 30, 2006

Related U.S. Application Data

(63) Continuation of application No. 09/704,740, filed on Nov. 3, 2000, now Pat. No. 7,110,974.

(51) Int. Cl.
    *G06Q 40/00*   (2006.01)
(52) U.S. Cl. ............................................. 705/37; 705/38
(58) Field of Classification Search .............. 705/10–44
    See application file for complete search history.

(56) References Cited

U.S. PATENT DOCUMENTS 4,674,044 A * 6/1987 Kalmus et al. ................. 705/37
5,347,452 A * 9/1994 Bay, Jr. ......................... 705/37
5,946,667 A * 8/1999 Tull et al. .................. 705/36 R
6,278,983 B1 * 8/2001 Ball .......................... 705/36 R
6,336,103 B1 * 1/2002 Baker ....................... 705/36 R
6,408,282 B1 * 6/2002 Buist ........................ 705/36 R
6,493,682 B1 * 12/2002 Horrigan et al. .......... 705/36 R
6,647,374 B2 * 11/2003 Kansal ......................... 705/37
6,681,211 B1 * 1/2004 Gatto ....................... 705/36 R

OTHER PUBLICATIONS

Paul Schultz, "Regulation and Legal Pressure and the costs of Nasdaq Trading", The Review of Financial Studies; Winter 2000: 13,4.*
J.Y. Choi et al., Jun. 1988, On the Estimation of Bid-Ask Spreads: Theory and Evidence:.*
PAul Schultz, "Regulatory and Legal Presures and the costs of Nasq Trading", University of NotreDame, Jan. 2000 (total of 61 pages).*
McInish et al, "An analysis of Intraday Patterns in Bid/Ask Spreads for NYSE Stocks", The Journal of finance, vol. XLVII, No. 2, Jun. 1992.*

(Continued)

*Primary Examiner*—Frantzy Poinvil
(74) *Attorney, Agent, or Firm*—Morgan, Lewis & Bockius LLP; Steven D. Underwood, Esq.

(57) ABSTRACT

The invention relates to a tool for estimating a pre-trade implementation shortfall for financial instruments. Through evaluating a number of factors, including the size of the order, the average daily volume of the stock, the average bid-ask spread of the stock, the volatility of the stock and the exchange on which the stock trades, the present invention estimates the cost of a trade. Using the disclosed system and method, a trader or fund manager may determine when and how to implement trades of varying size.

9 Claims, 17 Drawing Sheets

OTHER PUBLICATIONS

Clark et al., "Seasonalities in NYSe Bid-Ask Spreads and Stock Returns in Jan.", The Journal of Finance, vol. 47, No. 5, Dec. 1992, pp. 1999-2014.*

Atkins et al., Transaction Costs and Holding Periods for Common Stocks:, The Journal of Finance, vol. 52, No. 1 (Mar. 1997), pp. 309-325.*

Colin Rust, "Introducing PRISE", Lehman Brothers Equity Derivatives Resarch, Nov. 5, 1999, pp. 1-15.*

Murali Ramaswami, et al., "PRISE Performance: A First Look", Lemahn Brothers Equity Derivatives Research, Feb. 9, 2000, pp. 1-8.*

William Velasco, et al., "PRISE Performance, Preview of Fourth-Quarter 1999 Trading", Lehman Brothers Derivative Outlook, Mar. 3, 2000, pp. 19-21.*

* cited by examiner

| Length of Trade (Days) | Expected Cost | Lower Band (unhedged; 80% confidence) | Upper Band (unhedged; 80% confidence) | Lower Band (hedged; 80% confidence) | Upper Band (hedged; 80% confidence) |
| --- | --- | --- | --- | --- | --- |
| 1 | 0.62% | -0.48% | 1.73% | 0.04% | 1.21% |
| 2 | 0.45% | -0.83% | 1.74% | -0.10% | 1.01% |
| 3 | 0.38% | -1.08% | 1.84% | -0.19% | 0.95% |
| 4 | 0.33% | -1.28% | 1.95% | -0.26% | 0.93% |
| 5 | 0.30% | -1.46% | 2.07% | -0.31% | 0.92% |
| 6 | 0.28% | -1.62% | 2.18% | -0.36% | 0.92% |
| 7 | 0.26% | -1.76% | 2.29% | -0.41% | 0.93% |
| 8 | 0.25% | -1.90% | 2.39% | -0.44% | 0.94% |
| 9 | 0.24% | -2.02% | 2.50% | -0.48% | 0.96% |
| 10 | 0.23% | -2.14% | 2.59% | -0.52% | 0.97% |

Figure 4

| Length of Trade (Days) | Expected Cost | Lower Band (unhedged; 95% confidence) | Upper Band (unhedged; 95% confidence) | Lower Band (hedged; 95% confidence) | Upper Band (hedged; 95% confidence) |
|---|---|---|---|---|---|
| 1 | 0.62% | -1.06% | 2.31% | -0.28% | 1.53% |
| 2 | 0.45% | -1.51% | 2.42% | -0.40% | 1.31% |
| 3 | 0.38% | -1.85% | 2.61% | -0.49% | 1.25% |
| 4 | 0.33% | -2.14% | 2.81% | -0.57% | 1.24% |
| 5 | 0.30% | -2.40% | 3.00% | -0.64% | 1.25% |
| 6 | 0.28% | -2.63% | 3.19% | -0.70% | 1.26% |
| 7 | 0.26% | -2.84% | 3.36% | -0.76% | 1.28% |
| 8 | 0.25% | -3.03% | 3.53% | -0.81% | 1.31% |
| 9 | 0.24% | -3.22% | 3.69% | -0.86% | 1.34% |
| 10 | 0.23% | -3.39% | 3.85% | -0.91% | 1.36% |

| Country | Stocks | Dollars | Weight | Spread Cost | Size Impact | Total Exec Cost | Tot Exec Cost for $50 M in Country |
|---|---|---|---|---|---|---|---|
| Australia | 54 | $ 5,700,000 | 1.1% | 0.12% | 0.17% | 0.29% | 0.63% |
| Austria | 19 | $ 800,000 | 0.1% | 0.18% | 0.29% | 0.47% | 2.88% |
| Belgium | 16 | $ 2,800,000 | 0.6% | 0.19% | 0.28% | 0.47% | 1.38% |
| Canada | 75 | $10,100,000 | 2.0% | 0.15% | 0.43% | 0.58% | 1.11% |
| Denmark | 21 | $ 1,800,000 | 0.4% | 0.34% | 0.42% | 0.77% | 2.55% |
| Finland | 25 | $ 5,000,000 | 1.0% | 0.11% | 0.12% | 0.23% | 0.50% |
| France | 61 | $22,700,000 | 4.5% | 0.19% | 0.18% | 0.37% | 0.45% |
| Germany | 58 | $22,700,000 | 4.5% | 0.26% | 0.10% | 0.36% | 0.41% |
| Great Britain | 127 | $48,300,000 | 9.7% | 0.30% | 0.40% | 0.71% | 0.71% |
| Hong Kong | 33 | $ 5,200,000 | 1.0% | 0.05% | 0.21% | 0.26% | 0.69% |
| Ireland | 16 | $ 1,100,000 | 0.2% | 0.60% | 0.64% | 1.24% | 4.85% |
| Italy | 50 | $ 9,100,000 | 1.8% | 0.17% | 0.12% | 0.30% | 0.46% |
| Japan | 296 | $68,000,000 | 13.6% | 0.17% | 0.24% | 0.41% | 0.38% |
| Netherlands | 24 | $12,700,000 | 2.5% | 0.05% | 0.20% | 0.25% | 0.45% |
| New Zealand | 10 | $ 400,000 | 0.1% | 0.13% | 0.24% | 0.37% | 2.90% |
| Norway | 27 | $ 900,000 | 0.2% | 0.30% | 0.15% | 0.45% | 1.40% |
| Portugal | 18 | $ 1,100,000 | 0.2% | 0.18% | 0.15% | 0.34% | 1.21% |
| Singapore | 28 | $ 2,400,000 | 0.5% | 0.31% | 0.36% | 0.67% | 1.97% |
| Spain | 36 | $ 6,400,000 | 1.3% | 0.08% | 0.24% | 0.32% | 0.76% |
| Sweden | 31 | $ 5,500,000 | 1.1% | 0.15% | 0.18% | 0.32% | 0.68% |
| Switzerland | 31 | $15,200,000 | 3.0% | 0.08% | 0.24% | 0.32% | 0.51% |
| USA | 327 | $252,300,000 | 50.5% | 0.06% | 0.24% | 0.30% | 0.16% |
| MSCI World | 1383 | $500,000,000 | 100.0% | 0.12% | 0.25% | 0.37% | |

| Shares Traded | Average Difference | % of Total Trades |
|---|---|---|
| 100 | 0.24% | 31% |
| 1000 | 0.28% | 53% |
| 1500 | 0.50% | 4% |
| 2000 | 0.47% | 2% |
| 5000 | 0.52% | 5% |
| 10000 | 0.72% | 2% |
| 15000 | 0.73% | 1% |
| 20000 | 1.18% | 1% |
| > 20000 | 1.15% | 2% |
| Overall | 0.33% | 100% |

Figure 9

| Order Size | Average Difference | | Percentage of the Trades | | Total % of the Trades |
|---|---|---|---|---|---|
| | For Over-estimation | For Under-estimation | Over-estimation | Under-estimation | |
| 100 | 0.23% | 0.25% | 18.9% | 11.8% | 30.7% |
| 1000 | 0.25% | 0.37% | 39.9% | 13.3% | 53.2% |
| 1500 | 0.32% | 0.86% | 2.4% | 1.2% | 3.5% |
| 2000 | 0.38% | 0.65% | 1.4% | 0.7% | 2.1% |
| 5000 | 0.45% | 0.59% | 2.3% | 2.5% | 4.8% |
| 10000 | 0.68% | 0.76% | 1.1% | 1.0% | 2.1% |
| 15000 | 0.74% | 0.72% | 0.6% | 0.5% | 1.1% |
| 20000 | 0.73% | 1.65% | 0.4% | 0.3% | 0.7% |
| > 20000 | 0.83% | 1.33% | 0.7% | 1.2% | 1.9% |
| Overall | 0.27% | 0.43% | 67.5% | 32.5% | 100.0% |

Figure 10

| Trade Size (US Dollar Value) | Average Difference | Average of US Dollar Size of Trade | Percent of Trades |
|---|---|---|---|
| 2,500 | 0.30% | 1,542 | 26.6% |
| 5,000 | 0.24% | 3,482 | 18.2% |
| 10,000 | 0.20% | 7,147 | 14.0% |
| 20,000 | 0.21% | 14,343 | 11.1% |
| 50,000 | 0.30% | 32,039 | 11.5% |
| 75,000 | 0.47% | 60,773 | 4.2% |
| 100,000 | 0.60% | 86,540 | 1.8% |
| 200,000 | 0.51% | 142,112 | 4.9% |
| 500,000 | 0.67% | 312,599 | 4.2% |
| Over 500,000 | 0.93% | 1,760,855 | 3.5% |
| Overall | 0.33% | 92,909 | 100.0% |

Figure 11

| Exchange | Average Difference | % of Total Trades |
|---|---|---|
| AMEX | 0.61% | 1% |
| NYSE | 0.35% | 57% |
| NASDAQ | 0.29% | 42% |
| Overall | 0.33% | 100% |

Figure 12

| Share Price | Average Difference | Percent of Trades |
|---|---|---|
| 20 | 0.42% | 17.7% |
| 40 | 0.31% | 27.2% |
| 60 | 0.31% | 19.5% |
| 80 | 0.29% | 13.3% |
| 100 | 0.23% | 6.7% |
| 120 | 0.25% | 6.5% |
| 140 | 0.38% | 2.9% |
| 160 | 0.35% | 3.1% |
| 180 | 0.44% | 0.7% |
| 200 | 0.37% | 0.5% |
| Over 200 | 0.51% | 1.9% |
| Overall | 0.33% | 100.0% |

Figure 13

| Shares Traded | Average Difference | % of Total Trades |
|---|---|---|
| 100 | 0.11% | 34.12% |
| 1000 | 0.30% | 41.44% |
| 1500 | 0.38% | 6.44% |
| 2000 | 0.40% | 4.08% |
| 5000 | 0.44% | 9.09% |
| 10000 | 0.52% | 2.95% |
| 15000 | 0.70% | 0.87% |
| 20000 | 0.65% | 0.37% |
| >20000 | 0.86% | 0.65% |
| Total | 0.27% | 100.00% |

Figure 15

| Amount Traded | Average Difference | % of Total Trades |
|---|---|---|
| 2500 | 0.12% | 23.21% |
| 5000 | 0.19% | 11.67% |
| 10000 | 0.23% | 12.05% |
| 20000 | 0.31% | 11.77% |
| 50000 | 0.36% | 15.42% |
| 75000 | 0.32% | 7.56% |
| 100000 | 0.37% | 4.03% |
| 200000 | 0.42% | 6.37% |
| 500000 | 0.39% | 5.92% |
| >500000 | 0.63% | 2.00% |
| Total | 0.27% | 100.00% |

Figure 16

| Share Price | Average Difference | % of Total Trades |
|---|---|---|
| 20 | 0.38% | 13.00% |
| 40 | 0.28% | 31.83% |
| 60 | 0.25% | 22.60% |
| 80 | 0.23% | 15.02% |
| 100 | 0.23% | 8.16% |
| 120 | 0.22% | 4.05% |
| 140 | 0.24% | 1.95% |
| 160 | 0.25% | 1.13% |
| 180 | 0.17% | 0.64% |
| 200 | 0.24% | 0.38% |
| >200 | 0.24% | 1.26% |
| Total | 0.27% | 100.00% |

Figure 17

TOOL FOR ESTIMATING A COST OF A TRADE

CROSS REFERENCE TO RELATED APPLICATIONS

This application is a continuation application of U.S. patent application Ser. No. 09/704,740, filed Nov. 3, 2000 now U.S. Pat. No. 7,110,974. The entire contents of that application are incorporated herein by reference.

BACKGROUND OF THE INVENTION

1. Technical Field

The invention relates to financial systems for estimating the cost of a trade. More particularly, the present invention adds value to the trading process by allowing portfolio managers to estimate the cost of trading and thus make better informed decisions regarding whether and what to trade. Traders should find the present invention useful in helping them decide how to trade a portfolio of stocks and in evaluating a trade after the fact.

2. Conventional Art

"Buy low, sell high" has been the mantra of financial traders. In general, traders attempt to buy stocks at a low price then sell at a higher price. However, a time delay often exists between deciding to buy a stock and the execution of the trade. For example, if at the close of a market a stock is priced at $50 a share and a trader decides to purchase the stock, the next opportunity for a trader to purchase the stock is the next morning when the markets open.

This time delay may affect the stock price to the benefit or detriment of the trader. For example, the purchase price to the trader may have increased to $50.50, meaning the trader receives less stock for his investment. In the long run, the trader may pay more at the stock's opening than at the previous night's close. This added cost or friction creates a drag on stock performance.

Other costs associated with trading include fixed costs (which may include fees, taxes, and commissions) and execution costs (which may include spread costs and the impact trade size has on the market). The fixed costs are generally known more or less exactly prior to the trade. The execution costs are determined only when the trade is executed. Because they are not known in advance, execution costs must be estimated. Execution costs can be understood as a combination of spread cost and size impact costs, both of which must be evaluated to estimate execution costs.

Spread costs reflect the cost per share of executing a small order. If one always bought on the offer and sold on the bid, the spread cost would be half the bid-ask spread. However, the spread cost is generally less than half the quoted spread. There are two reasons for this. First, a dedicated trading team can frequently do better than the quoted inside market through the judicious use of limit orders. A second reason is that on certain exchanges (for example the New York Stock Exchange), it is common for market orders to be filled better than the quoted inside market.

Size impact reflects the additional cost per share of trading large orders. The quoted size on the inside bid or ask is frequently small compared with a typical institutional order. In some circumstances, the bid or offer is often good for more shares than the officially quoted size, but may be too small for a larger order. Thus, to execute a larger order, one may have to accept prices outside the current market, leading to an average execution cost that is more than half the bid-ask spread. Furthermore, even for orders that are smaller than the quoted size, one might not have the same ability to execute within the spread that one has for the smallest orders.

In addition, the cost associated with incomplete execution of a transaction may affect a trader's cost. For example, in the course of buying stock, the stock's price may increase to such an extent that it becomes undesirable to buy the remaining shares of the original order. Thus, when estimating the costs of a trade, one should consider the cost associated with the unexecuted purchase and include the opportunity cost of not being able to trade. Otherwise, one will tend to understate the true cost of trading.

Others have attempted to estimate execution costs. Usually, it is measured as the slippage of the execution from some benchmark, measured either in currency units or basis points. Commonly used benchmarks include:

1. The price of the stock just before the trade (often the prior close or closing mid-market is used as a proxy);
2. The volume-weighted average price (VWAP) of the stock over the trading period (sometimes the average of open, high, low and close is used as a proxy); or
3. The price of the stock on the close of trading.

The first benchmark mentioned above experiences slippage by the so-called "implementation shortfall." Coined as a term by A. F. Perold in "The Implementation Shortfall: Paper vs. Reality", *The Journal of Portfolio Management*, 14 (3) Spring (1988), pages 4-9, the implementation shortfall is the slippage of the execution from the prevailing price before the trade. This is the measure of execution cost that the present system seeks to predict. A virtue of using the price of the stock before the trade begins is that this benchmark cannot be influenced by one's own trading activity. From the portfolio manager's point of view, the implementation shortfall is the difference between his or her actual results and those of paper trading. A disadvantage of this approach is that a stock can move significantly over the trading period independent of one's own trading activity, making it difficult to isolate one's own impact. This can be mitigated somewhat by adjusting for market moves (except for very large programs that may materially move the market). In summary, implementation shortfall is an unbiased but noisy measure of execution cost.

The second benchmark experiences slippage to the volume-weighted average price (VWAP). VWAP is much less noisy than implementation shortfall. If the order is a small percentage of the traded volume, this is a good measure of execution cost. However, VWAP may be materially affected by large orders, understating the cost. For this reason, this measure is of dubious utility for larger orders—precisely the focus of institutional interest.

The third benchmark experiences slippage to the close of trading. The closing price may make sense in situations in which the customer is benchmarked to the close. The close may be affected by the execution of the trade itself.

Various elements contribute to the difficulties in estimating execution costs. First, execution costs are highly volatile. It is not uncommon to experience a negative shortfall or a shortfall of double the typical amount. In the long run and over the course of numerous trades, this volatility tends to cancel itself out somewhat, but it is important to bear it in mind when considering the cost of an isolated trade. Second, there can be considerable variation among managers. The alpha characteristics (the ability to pick good stocks consistently) and trading style of an individual manager can lead to a systematic bias toward a higher or lower implementation shortfall compared with other managers for similar stocks. For example, a manager who is an excellent short-term stock picker will likely experience a high average shortfall, because the stocks he or she buys tend to increase in price regardless of his or her trading activity. In such situations, pre-trade estimates of shortfall may be most useful in determining the relative execution costs for different portfolios or stocks, rather than the absolute level.

Others have attempted to represent costs of trading. These include Plexus Corp., Donaldson, Lufkin & Jenrette, Inc., Salomon Smith Barney Inc., and Barra Inc. However, for various reasons, these other approaches fail to account for various inaccuracies in their approach to estimating execution costs.

Until now, no system has existed that evaluates the above factors and permits a trader to accurately estimate the executing costs of his trades prior to trading.

SUMMARY

The present invention relates to a pre-trade estimation system and method that estimates the implementation shortfall for trading a portfolio of stocks or an individual stock. The time period for trading may be varied and confidence intervals for the implementation shortfall may be generated.

The present invention measures costs, including spread cost and size impact, to estimate the execution cost of trades. First, spread cost measures the per-share cost of executing a trade. For small orders, the spread is less than half of the bid-ask spread due to trader skill and filling the orders at a price superior to the inside market. Second, size impact measures the additional per share cost for trading large orders. Since the quoted bid and offer are not useful for the typical institutional order, executing these orders may require trading outside of the current market. In part, the invention measures the standard deviation of the cost of trading and presents a preferred trading window, or time frame, over which to implement the trade.

The present invention accounts for a variety of factors including the size of the order, the average daily volume of the stock, the average bid-ask spread of the stock, the volatility of the stock and the exchange on which the stock trades.

The present invention may be implemented to estimate the cost of trades in a variety of markets including the New York Stock Exchange, NASDAQ, and foreign markets as well.

To use the system of the present invention, a user inputs the size of the order and the other information. Alternatively, the other information may be received from a remote source. The remote source may be a database that stores daily and historical information regarding traded issues. The remote source of information is available from Reuters, Bloomberg, and others.

The present invention may be used in a variety of ways, including an analytic tool for making investments. For example, the present invention indicates a cost of a trade, which may be too expensive for the particular trader. Accordingly, the trader may reevaluate the need for the trade or even if the trade should be made at all. The present invention may also be implemented to establish a trade pattern (from trading all at once or making smaller trades over a period of time). Also, the present invention may be used to evaluate the costs of using certain traders. For example, the system may suggest that one trader is consistently more expensive than another trader. To reduce costs, the user of the invention may shift trades away from the expensive trader to less expensive traders. Further, one may use the present invention to perform portfolio optimizations. Moreover, one may use the present invention to evaluate the dynamic replication costs (or hedging costs) for options using models that include transaction costs.

These and other aspects of the invention will be apparent from the following drawings and description.

BRIEF DESCRIPTION OF DRAWINGS

FIG. 4 is a table of the estimated costs of FIG. 3 in accordance with embodiments of the present invention.

FIG. 6 shows a comparison between trade length, expected costs, and hedged and unhedged confidence values in accordance with embodiments of the present invention.

FIG. 7 shows estimated costs for issues in a variety of countries in a single portfolio in accordance with embodiments of the present invention.

FIG. 9 shows the difference between estimated and actual implementation shortfall for selected order size (number of shares to trade) categories.

FIG. 10 shows that the present invention may be viewed as tending to overestimate the actual impact cost.

FIG. 11 shows the average estimation difference for selected ranges of dollar values to trade.

FIG. 12 shows that the present invention does slightly better estimating NASDAQ trades versus NYSE trades.

FIG. 13 shows the present invention's estimation differences for selected stock price levels.

FIG. 15 shows the average difference between present invention estimate and the actual shortfall for selected share size of the order.

FIG. 16 shows the average difference between the present invention's estimate and the actual shortfall for select dollar value of the order.

FIG. 17 shows the present invention's estimation differences for selected stock price levels.

DETAILED DESCRIPTION

The present invention relates to systems and methods for estimating the implementation shortfall for a trade. The following documents are incorporated by reference as relating to cost estimation: "Introducing PRISE: The Lehman Brothers Pre-Trade Implementation Shortfall Estimation Model", published Nov. 5, 1999, "PRISE Performance: A First Look", published Feb. 9, 2000, and "PRISE Performance: Review of Fourth-Quarter 1999 Trading", published Mar. 3, 2000.

Two equations are used by the present invention. The first equation is shown as equation number 1:

$$Cost_{day}(a*e) + \left( b*\sigma*\sqrt{\frac{ordersize}{ADV}} \right) \quad (1)$$

The variables used in equation number 1 are as follows:

Cost$_{day}$ is the expected cost over one day of trading;

a and b are variables input by the user;

e is the average bid-ask spread of a stock;

ordersize is the order size;

ADV is the average daily volume traded on the market; and,

σ is the historical volatility of the stock.

The constants a and b are known to the user as values associated with the various markets around the world. These constants may be updated over time. Constant a relates to the magnitude of the spread cost, and constant b relates to the magnitude of size impact. Both of these constants may be determined by analyzing market fluxuations of previous trades. For example, constant a in Italy may be 0.8 for a given period while constant a for Germany may be 0.9 during the same period. In one embodiment, both a and b may be set to 1 for unknown markets or markets in which a trader does not know the values of a and b or in which the values have not been recently updated.

The values for the constants a and b are determined through a variety of methods. One method includes monitoring the execution costs for a block of trades during a short period and, using the other information available from the market (for example the spread, volume of trades, etc.), solve for a and b. One may use market data or the history of one's trades to determine a and b.

Figure 2:
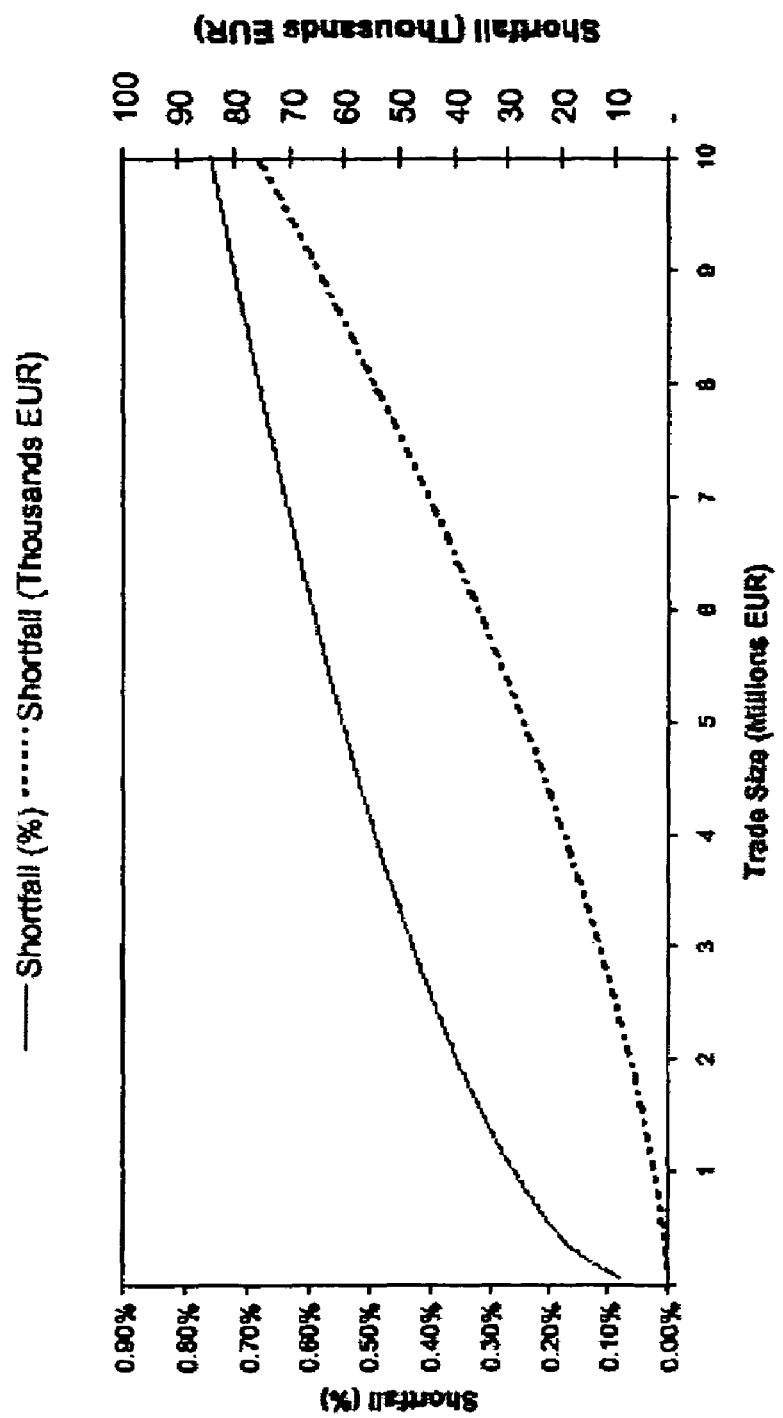
FIG. 2 is a graph reflecting the relationship between shortfall and volume of trades in a sample company in accordance with embodiments of the present invention.

Another method of determining a and b includes generating a basic curve for a given stock (as shown in FIG. 2) and recursively modifying a and b until the curve fits the performance known by the trader. This process may then be carried out for a number of stocks until general values of a and b are determined for each country/exchange. The initial values may be 1 and 1, respectively. However, other initial values may be used as the recursive adjustment of the values makes them approach their ultimate values. For example, one may select 10 and 0.1, respectively, for a and b. The recursive adjustments to the curve (as shown in FIG. 2) adjusts the values of a and b to their ultimate values. The grouping of stocks may be chosen based on the knowledge of past trades and other collective experience of the trader or traders.

In one embodiment, the average bid-ask spread is computed at the close of the previous night's close of the market. In another embodiment, the bid-ask spread may be computed at the time the system is run as well as well as during other times as well.

To compute the previous night's bid ask spread, one may use the following equation as shown as equation number 2.

$$\frac{1}{TVal} \sum_{\substack{minute\ i \\ in\ last\ N\ days}} MVal*2\left(\frac{ask_i - bid_i}{ask_i + bid_i}\right) \quad (2)$$

TVal represents the total value traded

N represents the number of days over which the equation is applied

Mval represents the value in minute i traded ask$_i$ represents the ask price at the end of the minute i bid$_i$ represents the bid price at the end of the minute i Equation number 2 provides a weighted average for the average bid-ask spread over time N. In the above equation, one may discard the minutes in which the bid price was greater than or equal to the ask price. The equation may be implemented as shown using all data or one may discard a portion of extreme values at either end of the spectrum. For example, one may eliminate the extreme 0.5%, 1.0%, 2.0%, 5.0% and the like. The percent discarded is variable even beyond the provided range. Eliminating more information provides the benefit of generating more consistent results. This elimination of data from this equation may be referred to as a trimmed weighted average. However, keeping in more information makes the analysis more accurate over the given window N.

Equation number 2 provides a weighted average for the bid and ask price spread. Other methods of determining the bid-ask spread may also be used including using a non-weighted average (which includes summing all spreads per interval of time divided by the total value traded). In other words, the non-weighted average is the same as that of equation 2 without the Mval term and substituting the number of terms in the sum (the number of spreads) for TVal.

The volatility σ is the historical volatility of the stock over a period.

Equation 3 represents an N-day analysis of the volatility of a stock:

$$\sigma = \sqrt{\frac{1}{N-1} \sum_{t=1}^{N} (\log(P_t/P_{t-1}) - \text{average return})^2} \quad (3)$$

where $$\text{average return} = \frac{1}{N} \sum_{t=1}^{N} \log(P_t/P_{t-1})$$

This equation is also provided in "Options, Futures and Other Derivative Securities" by John Hull. 2$^{nd}$ Ed. p. 215, Prentice-Hall. 1993. ISBN 0-13-639014-5.

Here, N−1 is used to account for the day ending the day before the actual trading day.

As an example, the invention may use a five day average daily volume (v over five days), a thirty day historic volatility (N$_t$=30), the exchange on which the stock trades (defining a and b), the size of the order (o), and the bid-ask spread of the stock.

The above process may be done for a single stock. Also, the above process may be used for a portfolio of stocks. To determine the cost for a portfolio, each stock may be computed separately. Alternatively, one may calculate the cost of portfolio as including a number of stocks as a group as one stock may vary with trades in another stock.

Various bid-ask spreads may be used. For example, close of trading bid-ask spreads may be used. Alternatively, one may use intra-day bid-ask spreads as well. One may use various data feeds to receive this information including data feeds from Bloomberg and Reuters. This information may be used in the Lehman Workbench analysis software.

Finally, one may compute the cost of a spread (a*e) as follows:

$$a*e = a*\text{halfspread} \quad (4)$$

where e and a are taken from equation 1 above. The half-spread represents half the average bid-ask spread. Alternatively, in markets with a material tick size (the minimum increment for prices at which a security may be traded), the spread cost (a*e) may be given by $$a*e = a\left(halfspread - \frac{1}{2}ticksize\right) + \frac{1}{2}ticksize.$$

An analysis of the equations follows.
1. Large orders are relatively expensive to trade.
2. Stocks with high volume tend to be cheaper to trade.
3. Stocks with higher spreads tend to be more expensive to trade.
4. Volatile stocks tend to be more expensive to trade than stocks that stay in tight trading ranges.
5. Similar stocks in different countries and on different exchanges within a country may be more or less expensive, depending on exchange structure and data reporting conventions.
6. The per-share cost of trading increases as the size of the order increases. However, research suggests that the per-share costs increases at a decreasing rate. Accordingly, the above-described system relates size impact as proportional to the square root of the size of the order. As an example, as a size of an order doubles, the estimated size impact will grow by about 40%.

Figure 1:
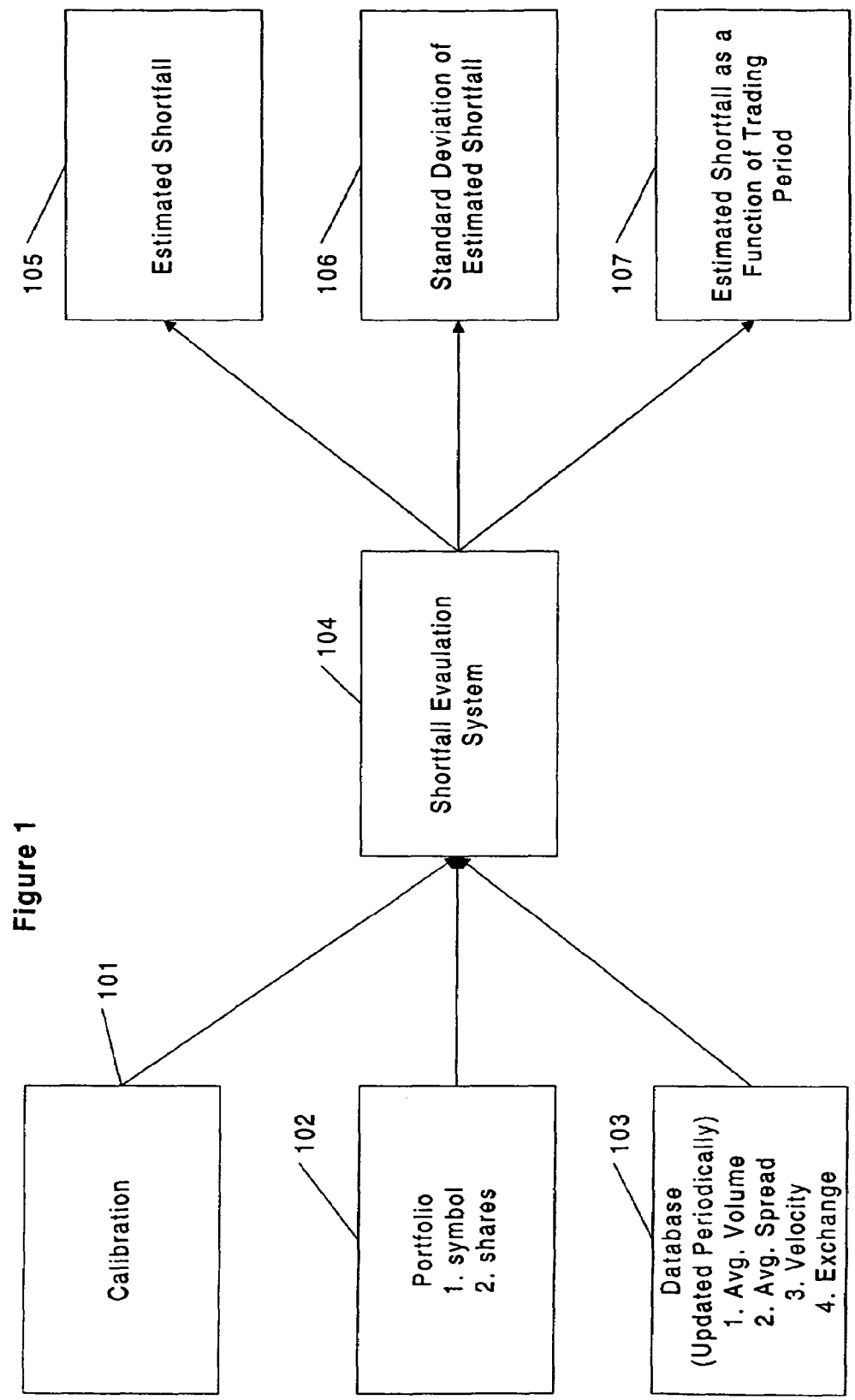
FIG. 1 is a flowchart, of information in accordance with embodiments of the present invention.

FIG. 1 shows a flowchart of the operation of the present invention. In step 101, the values of a and b are determined (or drawn from other sources). In step 102, the portfolio of items to be traded (one or more) and the number of holdings (or desired holdings) of each are determined. In step 103, a database stores the average daily volume for an exchange, an average daily spread, for the exchange, the volatility of issues on the exchange, and the identify of the exchange. The database may be periodically updated to reflect current market data. The database may also store the close price of the various shares and transmit this information to the system. Alternatively, the transmission of the portfolio in step 102 may include the closing price of the shares. Further, instead of the closing price of shares, real-time information may be used and forwarded to the system.

In step 104, the system receives the inputs from steps 101, 102, and 103 and generates a variety of outputs. In step 105, the system outputs an estimated shortfall of the trade. In step 106, the system outputs the standard deviation of the estimated shortfall. In step 107, the system outputs the estimated shortfall of the estimated trading period. The output of 107 may be a simple number or may be a table comparing the shortfall over time. The system may include a stand-alone computer with software implementing the above-identified equations in the computer's processor. Also, the system may include a web-based implementation in which the equations are embodied in a downloadable JAVA (or related) applet that may be used to run the equations locally. Further, the equations may be stored on a remote server (having at least one processor) with the local client forwarding information to the server for calculation with the results being transmitted back to the client. The outputs of steps 105, 106 and 107 may be shown on a computer display or may be stored on a medium including RAM, ROM, tape, hard drive, diskette, CD-ROM and the like.

FIG. 2 shows the estimated shortfall for orders of varying size in company A. The solid line shows the estimated cost in basis points. Observe that this number increases with the size of the trade, but at a decreasing rate. The dashed line shows the estimated cost in thousands of euros as a function of trade size. Because the cost per share is increasing, the total cost of the trade increases at an accelerating rate.

When implementing the above invention, one may need to account for a single trade to be reported as two or more trades. This leads to an inflation of reported volumes on such exchanges relative to other exchanges. To adjust for the redundant reporting of some exchanges, the system may have predefined limiting inputs to account for these practices and correct for inflated accountings.

As discussed above variables a and b are two free parameters that relate to the level of spread cost and the level of size impact. These parameters are calibrated periodically on a country-by-country and exchange-by-exchange basis. To peg the present invention to the most current trading environment, one may calibrate these parameters based on experience of trading equities.

To estimate the shortfall for a portfolio, the system adds up the estimated shortfall for the individual constituents. In trading a diversified portfolio there will generally be some stocks for which the shortfall is less than expected and others for which the shortfall is more than expected. The resultant cancellation reduces the variance of the shortfall for portfolios. This is an effect that exists in the market but has been difficult to estimate due to large quantities of transactions of portfolios. The present system addresses this cancellation. In one analysis, this effect may also reduce the expected shortfall.

Nonetheless, the reduction in the variance of shortfall due to diversification may indirectly reduce the expected cost of trading by allowing one to be more patient and trade over a longer period of time without taking on excessive risk. This effect is discussed below. In this regard, one of the principal motivations for trading portfolios as portfolios rather than as a series of block trades is to manage exposures to various factors and to fully capture the reduction in variance of the shortfall. While better and worse executions will tend to cancel each other out somewhat even in independent block trades, this is often not as effective as managing the trade as a whole. For instance, for a trade that starts out initially balanced between buys and sells, a dedicated program trading desk may ensure that the buys and sells are executed at approximately equal rates. This ensures that one is not exposed to market risk unnecessarily.

One may request that all trades to be executed in a single day. However, for larger trades it is frequently desirable to trade over longer periods. Such trades may constitute a large percentage of a single day's volume, leading to excessive execution cost if executed too quickly as the combination of trades could adversely affect the share price.

Figure 3:
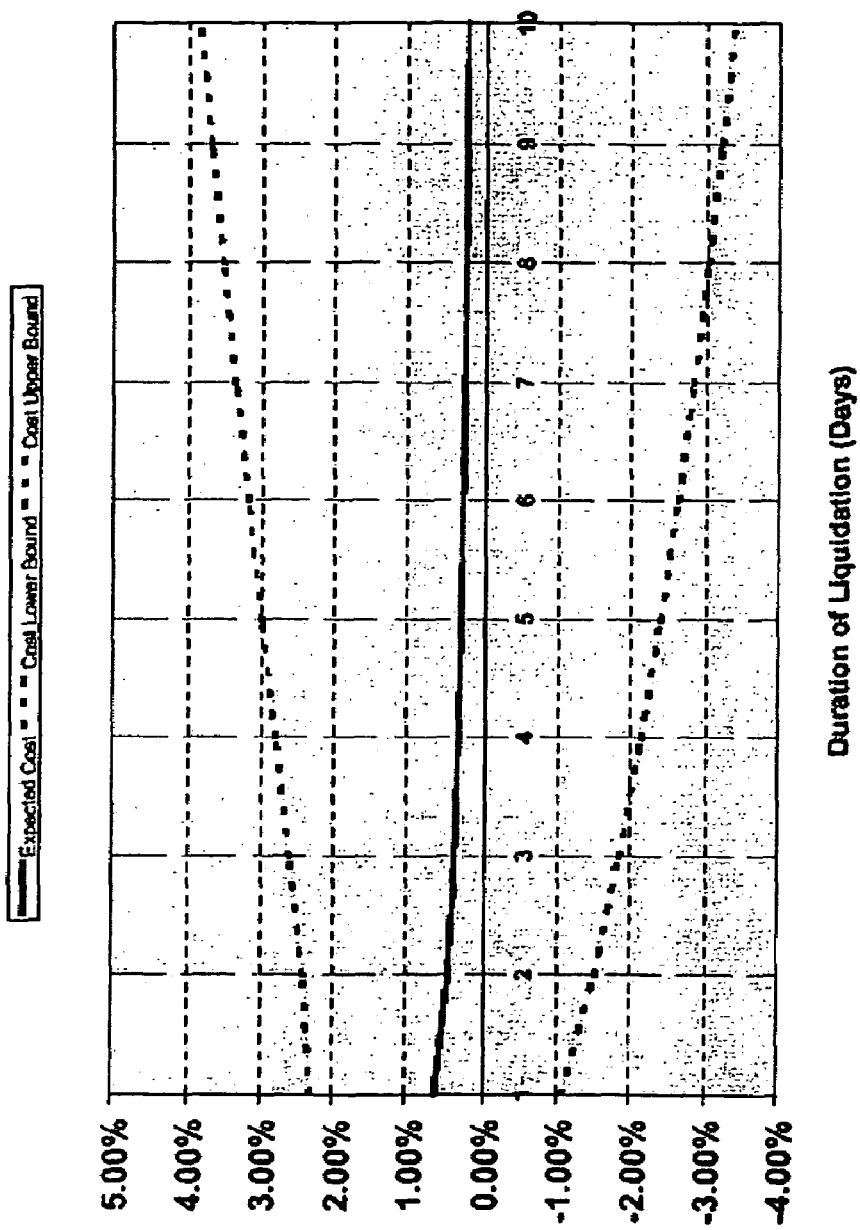
FIG. 3 is a graph of estimated costs associated with a trades occurring over time in accordance with embodiments of the present invention.

For example, the system provides a framework for deciding on the period to trade. Say that a buy-side trader must buy a USD $500 million Dow Jones basket. Using the system, the trader estimates the cost of executing this trade over periods from one to ten days, together with upper and lower bounds at the 80% confidence level (approximately 1.3 standard deviations). This is represented in graphical form in FIG. 3 and in tabular form in FIG. 4. The solid line shows the expected shortfall, as a function of the duration of the trade. The dashed lines show the upper and lower bounds on shortfall at the 80% confidence level. Thus, the system estimates that there is a one in five chance that the shortfall will be outside the indicated bounds and a one in ten chance that it will be above the upper bound. Note that for longer trading periods, the lower bound on shortfall becomes negative, because the stocks may have moved favorably independently of the trader's actions. Inspecting this graph, the investor might decide to trade over a single day, since that is the period with the lowest 80% confidence upper bound on the shortfall.

Figure 5:
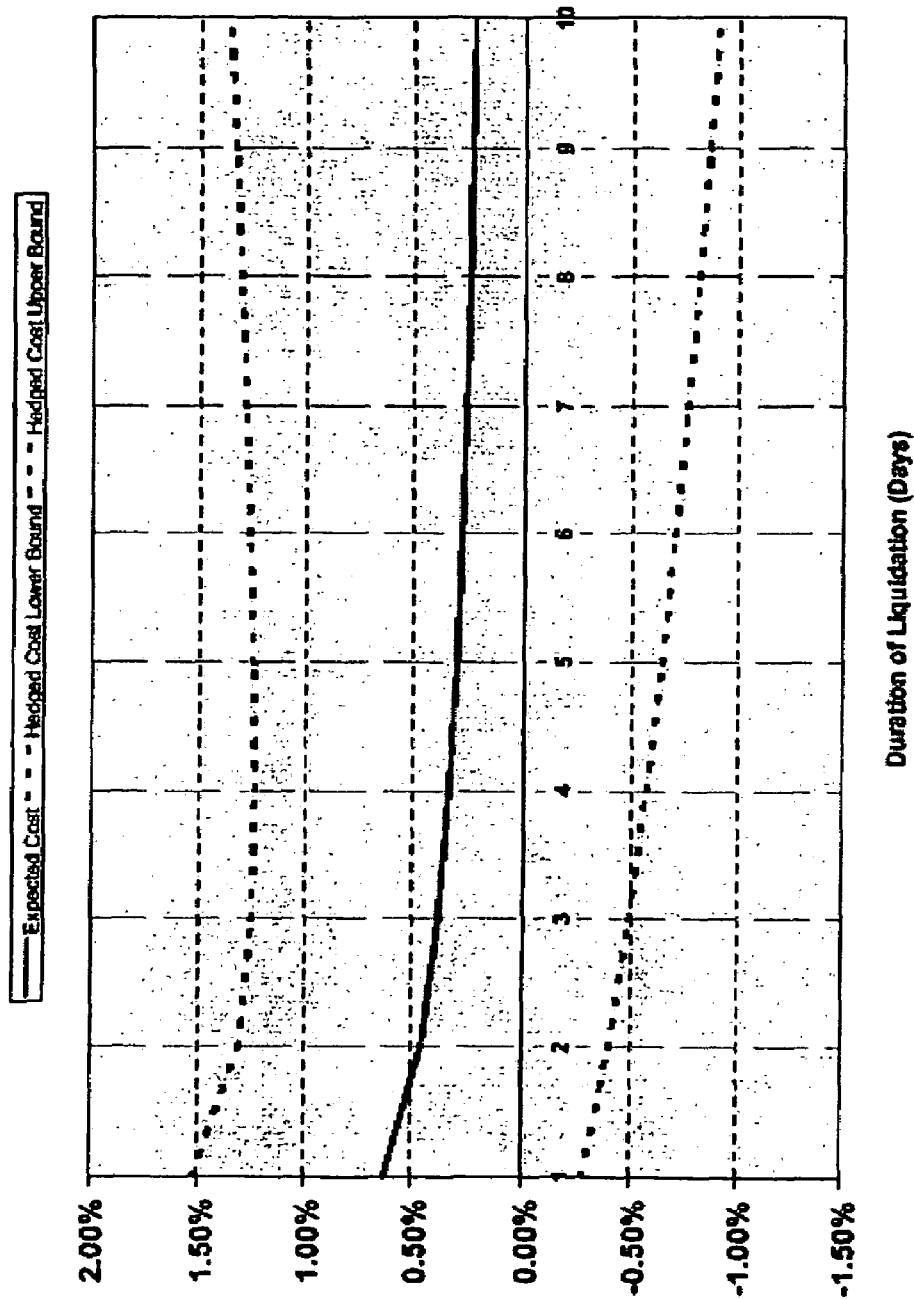
FIG. 5 is a graph of estimated costs associated with hedged trades occurring over time in accordance with embodiments of the present invention.

The futures market holds additional complications above that of the simple buy low/sell high market approach. In this situation, the trader would want to select an optimal trading period when hedging with futures. One could initially buy S&P futures to hedge the buy order and sell out the futures as he or she buys the stock, on a beta-adjusted basis. This hedging activity would not, according to the present invention, reduce the expected shortfall for a fixed trading period. In fact, the hedging would increase the cost of trading slightly, because of the additional cost of trading futures. However, the hedging would dampen the variance of the impact. This allows the trader to be more patient than in the unhedged case, without taking on additional risk. This patience, i.e., a longer trading period, reduces the expected shortfall. FIG. 5 repeats the analysis of FIG. 3 but assumes hedging with futures. Assuming the trader again uses the criterion of minimizing the 80% upper confidence bound, the optimal liquidation period becomes five days, compared with one day for the unhedged trade. This reduces the estimated shortfall from approximately 0.62% to 0.30%, with the upper confidence bound also reduced from 1.73% to 0.92%. The benefits of hedging are clear. Incidentally, the benefits of diversification are also brought to the fore by such an analysis. Although in a fixed trading period scheme diversification does not reduce expected shortfall, it does reduce the variance of shortfall. In a variable trading period scheme, this may also reduce expected shortfall.

Every trader is different, and each trader has a different confidence level. The appropriate confidence level depends on the risk aversion of the trader. For instance, a highly risk-averse trader might use the 95% confidence level. The present invention estimates that a one-day period has the lowest upper bound on impact for the unhedged trade and four days for the hedged trade (see FIG. 6). In general, the higher the desired confidence level, the shorter the recommended duration of the trade. Many customers have a bias in favor of shorter trades for operational reasons. This may be accounted for by overstating the desired confidence level. The analysis may also be customized to incorporate assumptions about the cost of carry, alpha and the frequency of internal crossing.

The system may be applied to a global portfolio. For example, FIG. 7 shows the estimated execution costs for a USD $500 million MSCI (Morgan Stanley Capital International, Inc.) World basket with the breakdown by country. The far right column shows the cost for a $50 million basket in each country.

The present invention has been tested. The following provides two testing scenarios under which testing was performed and the related results.

Analysis Scenario No. 1

A number of trades were analyzed in the first testing scenario. The analyzed trades included over 3500 trades that were executed from Jan. 13 to Jan. 25, 2000 (9 trading days). Only trades where the trader could exercise discretion in execution were included. In other words, market-on-open, market-on-close, crosses and EFP (exchange for physical) trades were eliminated. The present invention accurately predicted the market impact of executing a trade. The mid-price of the latest bid and ask quote prior to the start of the trade execution was used to predict the market implementation shortfall. For the sample, an average difference in implementation shortfall of 33 basis points between realized and predicted was found. This is an absolute average difference. That is, high and low differences were not offset. The average is based upon the difference between the actual less the estimate as determined by the present invention and expressed as percentage of the mid-market price prior to starting trade execution.

Ninety-two percent of the trades were less than one standard deviation from this average. Here, the standard deviation of the estimation difference is 59 basis points. The average share price of the sample trades is $72.22. Thus, the difference between the actual implementation shortfall and the predicted implementation shortfall translates into an average of 23.5 cents for the sample set of trades.

Figure 8:
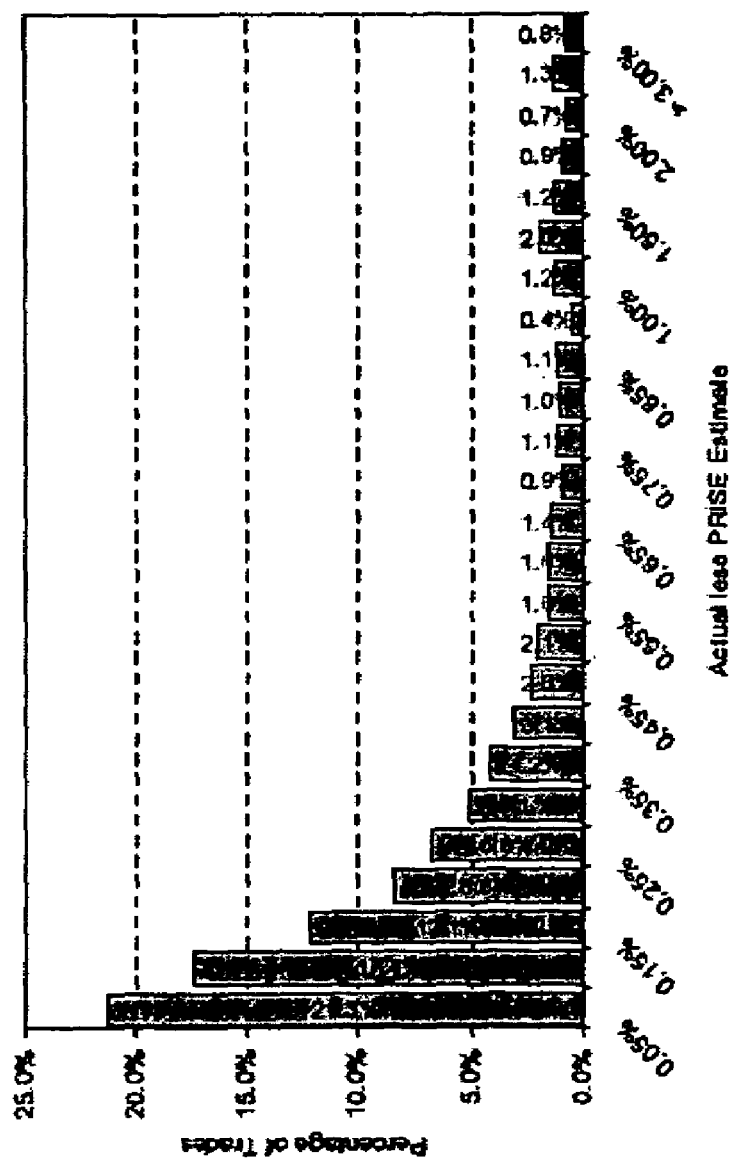
FIG. 8 shows a graph of percentage of trades versus actual less PRISE estimate.

The present invention's performance is measured by the absolute value of the spread between the actual implementation shortfall. The present invention's estimate is expressed as the percentage of the mid-market price prior to the start of trade execution. Here, the average difference overall is 33 basis points. The difference of actual and predicted implementation shortfall where the predicted value is based upon the prior day's closing price. The average difference under this scenario is 2.3%. Part of this difference is due to the movement of the market prior to actual execution of the trade. However, as shown in FIG. 8, a substantial majority of the trades (71%) have an estimated versus actual difference below this average. The average estimation differential is not substantially different for buys (31 basis points) versus sales (35 basis points).

FIG. 9 shows the difference between estimated and actual implementation shortfall for selected order size (number of shares to trade) categories. Eighty-four percent of the sample trades are for orders of 1000 shares or less. For orders of 100 shares or less the average difference between the present invention's estimate and the actual implementation shortfall is 24 basis points. For orders over 100 shares and up to 1000 shares (inclusive) the difference is 28 basis points. As expected, larger orders have a higher differential. However only 11% of the sample trades have a differential greater than 50 basis points.

In the sample trades, as shown in FIG. 10, the present invention may be view as tending to overestimate the actual impact cost. For over 67% of the trades, the implementation shortfall is overestimated. About 84% of the trades have an order size of 1000 or less shares. Of this group, the present invention overestimates the implementation shortfall in 70% of the trades. Thus, in these sample trades, the actual implementation shortfall is usually less the present invention's estimate.

FIG. 11 shows the average estimation difference for selected ranges of dollar values to trade. Over 81% of the sample trades are for a dollar value equal to $50,000 or less. These trades have an average difference between the actual execution and the present invention's estimate of 30 basis points or less. Here, larger estimation differentials are associated with the larger trades (measured by dollar amount to trade). That is, one expects more variance in the implementation shortfall as one moves further from the average trade size.

FIG. 12 shows that the present invention does slightly better estimating NASDAQ trades versus NYSE trades. It is appreciated that this is but one example. Multiple other markets may be used. In the present sampling test, the present invention errors for NASDAQ average 29 basis points, six basis points less than the average NYSE error (35 basis points).

FIG. 13 shows the present invention's estimation differences for selected stock price levels. The lowest and the highest priced stocks have higher differences than the average stock. That is, the present invention's estimation differential has a U-shaped distribution with respect to the trading price.

Analysis Scenario No. 2

A second set of sample trades were analyzed. Again, the present invention accurately predicted the market impact of executing a trade. The trade sample includes more than 45,000 trades that were executed from Oct. 1, 1999 to Dec. 31, 1999. Only trades where the trader could exercise discretion in execution were selected. That is, market-on-open, market-on-close, crosses, and EFP (exchange for physical) trades were eliminated.

The midprice of the latest bid and ask quote prior to the start of the trade execution to predict the market implementation shortfall was used. For the sample, an average difference in implementation shortfall of 27 basis points between realized and predicted was found. This is an absolute average difference. High and low differences were not offset. The average is based upon the difference between the actual less the present invention's estimate expressed as percentage of the midmarket price prior to starting trade execution. Of all the trades, 92% are less than one standard deviation from this average. The standard deviation of the estimation difference is 56 basis points. The average share price of the sample trades is $59.76. Thus, the difference between the actual implementation shortfall and the predicted translates into an average of 16 cents for the sample set.

Figure 14:
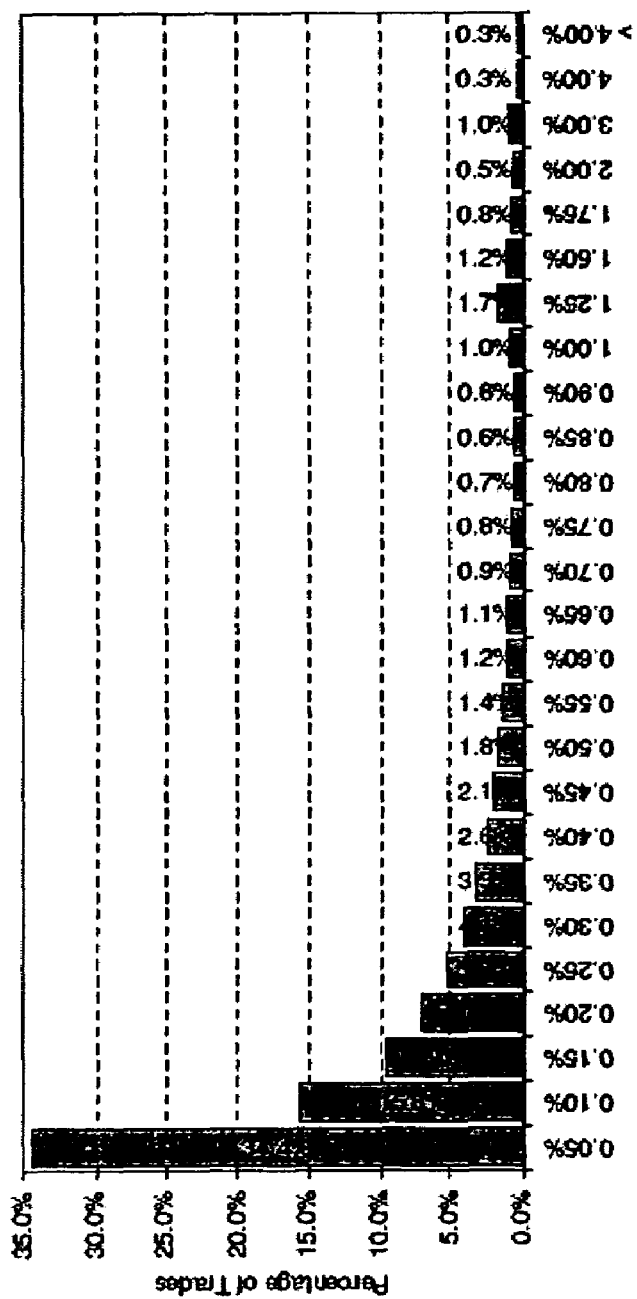
FIG. 14 highlights the percentage of trades that are below the average difference between the present invention and the actual shortfall.

FIG. 14 highlights the percentage of trades that are below the average difference between the present invention and the actual shortfall. In fact, 72% of the trades are below the average difference.

FIG. 15 shows the average difference between present invention estimate and the actual shortfall for selected share size of the order. The present invention does better for smaller share orders. About 76% of the trades have an actual difference between the actual and the present invention's estimate of 30 basis points or less.

FIG. 16 shows the average difference between the present invention's estimate and the actual shortfall for select dollar value of the order. The present invention's estimate does better for smaller orders. About 82% of the trades have a difference between the actual and the present invention's estimate of 36 basis points or less.

FIG. 17 shows the present invention's estimation differences for selected stock price levels. The two lowest price categories represent about 44% of the trades and have the largest differences. However, only the $20-and-under category (13% of the trades) has a large positive difference versus the average discrepancy of the present invention.

The present invention is described in relation to stock trading. Other tradable issues may be analyzed using the present system as well. For example, the present system may be applied to trading in other markets. Other modifications will be apparent to those of ordinary skill in the art without departing from the scope of the invention.

I claim:

1. A system for estimating execution costs of a trade, comprising:
    one or more computer processors operable to calculate an average bid-ask spread of one or more securities;
    one or more computer processors operable to calculate values associated with one or more markets;
    one or more computer processors operable to receive and store data regarding an order size for said one or more securities;
    one or more computer processors operable to receive and store data regarding an average daily volume of said one or more securities traded on a specified market;
    one or more computer processors operable to calculate data regarding historical volatility of said one or more securities;
    one or more computer processors operable to calculate an estimated cost of trading said one or more securities using data comprising a first formula based on said average bid-ask spread, said values associated with one or more markets, said data regarding order size, said data regarding average daily volume, and said data regarding historical volatility; and
    an electronic display component, in communication with said one or more computer processors operable to calculate an estimated cost, operable to display said estimated cost,
    wherein said first formula comprises a first multiplicative product of at least one of said values associated with one or more markets and said average bid-ask spread.

2. A system as in claim 1, wherein said first formula comprises a second multiplicative product of at least one of said values associated with one or more markets, said historical volatility, and a square root of a ratio of said order size to said average daily volume.

3. A system as in claim 2, wherein said first formula comprises a sum of said first multiplicative product and said second multiplicative product.

4. A system as in claim 1, wherein said first formula comprises a multiplicative product of at least one of said values associated with one or more markets and said historical volatility.

5. A system as in claim 1, wherein at least one of said values associated with one or more markets is related to spread cost magnitude.

6. A system as in claim 1, wherein at least one of said values associated with one or more markets is related to size impact magnitude.

7. A system as in claim 1, wherein said average bid-ask spread is based on data regarding market close for an immediately preceding trading day.

8. A system as in claim 1, wherein said average bid-ask spread is calculated based on a second formula comprising a total value traded over a given larger time period, values traded in specified smaller time periods that are fractions of said larger time period, and bid and ask prices at the ends of said smaller time periods.

9. A system as in claim 2, wherein said first formula comprises a sum of at least said first multiplicative product and said second multiplicative product.

* * * * *